United States Patent [19]
Foelker

[11] Patent Number: 6,154,533
[45] Date of Patent: Nov. 28, 2000

[54] SYSTEM AND METHOD FOR PROVIDING MULTIPLE CONFIGURABLE DIALING PLANS IN A CALL PROCESSING PLATFORM

[75] Inventor: Daniel W. Foelker, Milwaukee, Wis.

[73] Assignee: MCI Communications Corporation, Washington, D.C.

[21] Appl. No.: 09/073,886

[22] Filed: May 7, 1998

[51] Int. Cl.[7] .............................. H04M 3/42; H04M 1/64; H04M 7/00
[52] U.S. Cl. ...................... 379/201; 379/88.01; 379/207; 379/219; 379/912
[58] Field of Search ..................................... 379/201, 207, 379/219, 220, 229, 242, 258, 284, 912, 88.01, 88.03, 88.16, 88.18

[56] References Cited

U.S. PATENT DOCUMENTS

| | | | |
|---|---|---|---|
| 4,827,500 | 5/1989 | Binkerd et al. ................... | 379/88.03 X |
| 5,878,124 | 3/1999 | Griesmer et al. ........................ | 379/201 |
| 5,887,058 | 3/1999 | Kammath et al. ....................... | 379/284 |

FOREIGN PATENT DOCUMENTS

PCT/US99/09724  5/1999  WIPO .

*Primary Examiner*—Harry S. Hong

[57] ABSTRACT

A call processing platform provides the intelligence for a caller to choose a preferred dialing plan. In particular, the call processing platform includes the support for multiple dialing plans and holds information regarding which dialing plan is preferred by a caller. When the caller initiates a call, the call processing platform assumes that the caller entered the call in accordance with the preferred dialing plan of the caller. The call processing platform also includes intelligence for translating the call, if needed into a format that complies with a dialing plan for a locale from which the call was initiated. As a result, the call may be completed in the proper format. The translation is transparent to the caller. This enables a caller to use a single dialing plan even when the caller initiates calls outside of the geographical location associated with the calling plan. Hence, it is easier for the caller to place calls from outside of the native country of the caller.

29 Claims, 8 Drawing Sheets

| Dialing Plan Type | Country Code | Domestic | | | | | | International | | | | | Special 1 | | | | | Special 2 | | | | |
|---|---|---|---|---|---|---|---|---|---|---|---|---|---|---|---|---|---|---|---|---|---|---|
| | | Make Length | Dial Prefix | Switch Prefix | Min. Length | Max. Length | NOA | Dial Prefix | Switch Prefix | Min. Length | Max. Length | NOA | Dial Prefix | Switch Prefix | Min. Length | Max. Length | NOA | Dial Prefix | Switch Prefix | Min. Length | Max. Length | NOA |
| 1 | 1 | 6 | 9999 | 9999 | 10 | 10 | 3 | 011 | 9999 | 10 | 15 | 4 | 9999 | 9999 | 9999 | 9999 | 9999 | 9999 | 9999 | 9999 | 9999 | 9999 |
| 5 | 1 | 3 | 0 | 44 | 8 | 11 | 4 | 00 | | 10 | 15 | 4 | 001 | 9999 | 10 | 10 | 3 | 144 | 80085 44826 | 0 | 0 | 3 |

FIG. 4 (74)

| Dialing Plan Type | Domestic | | | | | | | International | | | | | Special 1 | | | | | Special 2 | | | | |
|---|---|---|---|---|---|---|---|---|---|---|---|---|---|---|---|---|---|---|---|---|---|---|
| | Country Code | Make Length | Dial Prefix | Switch Prefix | Min. Length | Max. Length | NOA | Dial Prefix | Switch Prefix | Min. Length | Max. Length | NOA | Dial Prefix | Switch Prefix | Min. Length | Max. Length | NOA | Dial Prefix | Switch Prefix | Min. Length | Max. Length | NOA |
| 1 | 1 | 6 | 9999 | 9999 | 10 | 10 | 3 | 011 | 9999 | 10 | 15 | 4 | 9999 | 9999 | 9999 | 9999 | 9999 | 9999 | 9999 | 9999 | 9999 | 9999 |
| 5 | 1 | 3 | 0 | 44 | 8 | 11 | 4 | 00 | | 10 | 15 | 4 | 001 | 9999 | 9999 | 9999 | 3 | 144 | 80085 44826 | 0 | 0 | 3 |

| Dialing Plan Type | Domestic | | | | | | | International | | | | | | Special 1 | | | | | |
|---|---|---|---|---|---|---|---|---|---|---|---|---|---|---|---|---|---|---|---|
| | Country | Max. | Min. | Prefix | Switch Prefix | NOA | TyTerm | Prefix | Switch Prefix | Min. | Max. | NOA | TyTerm | Prefix | Switch Prefix | Min. | Max. | NOA | TyTerm |
| 0 | 1 | 6 | -1 | -1 | -1 | 3 | 0 | 011 | -1 | 10 | 15 | 4 | 1 | -1 | -1 | -1 | -1 | -1 | 2 |
| 5 | 44 | 3 | 8 | 0 | 44 | 4 | 0 | 00 | -1 | 10 | 15 | 4 | 1 | 001 | -1 | 10 | 10 | 3 | 2 |

FIG. 6

SYSTEM AND METHOD FOR PROVIDING MULTIPLE CONFIGURABLE DIALING PLANS IN A CALL PROCESSING PLATFORM

TECHNICAL FIELD

The present invention relates generally to telecommunications systems and more particularly to a system and method for providing multiple configurable dialing plans in a call processing platform.

BACKGROUND OF THE INVENTION

A "dialing plan" provides a description of the dialing arrangements that a customer must use on the telephone network. For customers in the United States, the dialing plan dictates that a caller dials a seven digit phone number to place local calls. To place long distance domestic calls, a caller dials a "1" followed by an area code, which, in turn, is followed by a seven digit phone number. To place international calls, a caller must dial "011" followed by a country code and a remaining portion of the phone number that is particular to the country being called.

Dialing plans are typically associated with given countries or geographic regions. For example, one dialing plan may be associated with the United States and another may be associated with France. The use of multiple dialing plans in different portions of the world poses a problem when a caller travels outside of the home country of the caller. In such an instance, the caller may not know how to properly place a call in the foreign country because the caller is not familiar with the dialing plan provided for the foreign country. The caller has no choice of which dialing plan to employ. The caller must use the dialing plan of the locale from which the call originates.

Hence, there is a need to provide an approach to placing calls so that it is easier for a caller to place a call originating from a location outside of the native country of the caller.

SUMMARY OF THE INVENTION

The present invention overcomes the limitations of the prior art by enabling a caller to select which dialing plan is to be utilized by the caller. This dialing plan may be utilized even outside of the country with which the dialing plan is associated. Given that the caller is familiar with the dialing plan selected by the caller, the caller knows how to place calls and is not needlessly frustrated in attempting to originate a call. The present invention provides a translation mechanism for translating the digits dialed by the caller in the selected dialing plan into digits that are acceptable for the dialing plan of the locale from which the call originated, if necessary. In the United States, for example, a user may select a United States dialing plan and place all calls so that the calls conform with the United States dialing plan. These calls may include both calls that originate within the United States and calls that originate outside the United States.

The translation of the digits dialed by the caller into digits that are in proper format for the native dialing plan is transparent to the caller. In one embodiment, the translation is performed by a call processing platform. The call processing platform may provide additional services, such as calling card services, prepaid card services, collect call services and operator services. The call processing platform includes intelligence for accessing a storage, such as a database, that holds information regarding the caller. This information may include an identification of the dialing plan that is preferred by the caller. When the caller originates a new call, the call processing platform accesses information and determines that the caller is using a selected dialing plan. The call processing platform then converts the digits dialed by the caller into a format that is suitable for the dialing plan employed at the location from which the call originated.

A caller need not choose the dialing plan that is native to the caller's domestic country. Instead, the caller may choose any of a number of multiple dialing plans that are available. For example, a caller who resides in the United States may choose a British dialing plan if the caller so desires. The dialing plans supported by the call processing platform may be dynamically configured. Specifically, dialing plans may be added or deleted over time. Moreover, the dialing plan chosen by a caller may be changed at a callers request.

In another embodiment, the present invention provides support for a manual operator counsel (MOC). In this alternate embodiment, a software facility executes on a MOC so that an operator may enter a number dialed by a caller, and the software facility will perform the translation necessary to convert the digits of the number provided by the caller into a format that is suitable for the dialing plan of the locale from which the call originated. Hence, a caller may call an operator in Italy and provide the operator with a phone number that conforms with a United States dialing plan. The software facility on the MOC allows the operator to enter the digits provided by the caller, translates the digits into a format appropriate for the Italian dialing plan and make/word the digits to initiate and complete the call. The translation is transparent to both the caller and the operator.

It should be appreciated that the present invention may be practiced both with calling cards and without calling cards. It should also be appreciated that the call processing platform may be replaced with a programmable switch or other mechanism that is capable of performing the translation and make/word the appropriate digits.

BRIEF DESCRIPTION OF THE DRAWINGS

An illustrative embodiment of the present invention will be described below relative to the following drawings.

FIG. 4 illustrates an example of data associated with different dialing plans.

FIG. 6 shows an example of the data that is maintained for multiple dialing plans for use by a manual operating counsel (MOC).

DETAILED DESCRIPTION OF THE INVENTION

The illustrative embodiment of the present invention provides a software facility and a database for use by a call processing platform to facilitate a caller using a dialing plan of a caller's choice regardless of where the caller originates calls. The call processing platform includes resources for receiving digits dialed by the caller to initiate a phone call and translating the digits into a format that is suitable for the dialing plan that is used at the location from which the call originates. The caller chooses the dialing plan that the caller desires to use and employs this dialing plan in originating all calls.

The calls may originate from locations outside of the location that supports the dialing plan. Thus, a caller may choose a dialing plan for a first country and still employ the chosen dialing plan in placing calls that originate from outside of the country. The translation performed by the call processing platform is transparent to the user.

The call processing platform may support multiple dialing plans. A caller may be presented with the option of choosing among all of the available dialing plans or only a subset of the dialing plans. The dialing plan chosen by the caller need not be the dialing plan of the native country of the caller. The call processing platform supports extensibility such that new dialing plans may be added to those that are available to callers. In addition, dialing plans may be removed from among those supported by the call processing platform. New customized dialing plans may be defined and readily added to the call processing platform.

The call processing platform may include a voice response unit that holds the intelligence for performing the translation of digits entered by a caller into digits that are appropriate for the dialing plan of the locale from which the call originates. The illustrative embodiment of the present invention also includes a software facility that may run on MOC to perform the translation on behalf of human operators. In such a translation the operator may enter digits of a phone number provided by a caller and the software facility automatically and transparently translates the digits into the appropriate format for the dialing plan from which the call originates. The digits provided by the caller conform with the dialing plan selected by the caller. The software facility may also include check mechanisms for ensuring that the number provided by the caller is a valid terminating phone number.

The illustrative embodiment of the present invention greatly simplifies the placement of phone calls outside of a caller's native country. The caller need only know the syntax of a given dialing plan. There is no need for the caller to master an unfamiliar dialing plan or a large number of dialing plans.

Figure 1:
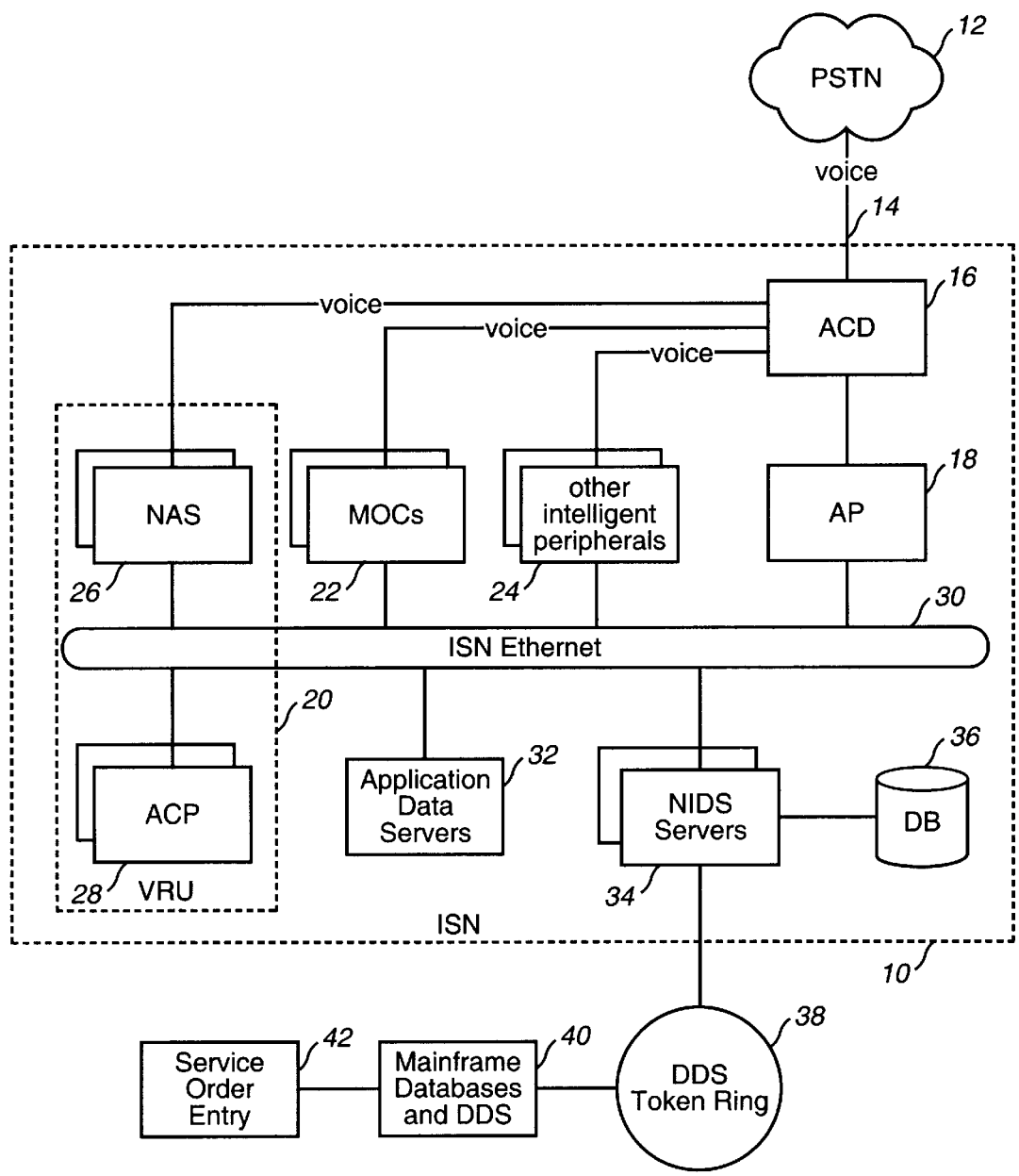
FIG. 1 is a block diagram depicting a telecommunications system that is suitable for practicing the illustrative embodiment of the present invention.

FIG. 1 depicts a block diagram of a telecommunications system that is suitable for practicing the illustrative embodiment of the present invention. The telecommunications network includes an intelligent services network (ISN) 10 that is connected to a public switched telephone network (PSTN) 12 via one or more voice trunks 14. The ISN 10 is a call processing platform that provides advanced services, such as calling card services, prepaid card services, collect call services and operator services. As will be described in more detail below, the ISN 10 also supports the use of multiple dialing plans. The ISN 10 employs an automatic call distributor (ACD) 16 for performing calls switching within the ISN 10. Those skilled in the art will appreciate that the ACD 16 may be replaced with other switching or routing mechanisms. The ACD 16 then queues incoming calls from the PSTN 12 for routing the calls to one of multiple service components provided within the ISN 10. These service components include a voice response unit (VRU) 20 that provides voice response services to the ISN 10. The service components also include manual operator counsels (MOCs) that are used by human operators in servicing calls. Other intelligent peripherals 24 may also be provided within the ISN 10. The VRU 20 includes a network audio server (NAS) 26 and an automated call processor (ACP) 28. The NAS 26 is a specialized computer system that provides software control for audio messages, DTMF signal input collection and voice recognition. The ACP 28 is a computer system that executes software for performing automated call processing. The role of the NAS 26 and ACP 28 in the illustrative embodiment of the present invention will be described in more detail below. The ACD 16 is connected to these service components 20, 22 and 24 via voice links.

An adjunct processor (AP) 18 is coupled to the ACD 16 to assist the ACD in performing call processing functions that otherwise would be performed by the ACD. When the ACD 16 receives an incoming call, the ACD sends a message to the AP 18 that includes the automatic number identification (ANI) of the call, the number dialed to originate the call and other data pertaining to the call. The ANI identifies the phone number of the telephone from which the call originated. Based on the data provided in the message and based on current call loads and queues, the AP 18 determines which service component should receive the call and identifies this service component in a response message that is sent to the ACD 16. The ACD 16 then routes the call to a port for a service that is component identified by the response message sent from the AP 18.

The service components 20, 22 and 24 and the AP 18 are interconnected via an Ethernet 30. Those skilled in the art will appreciate that these components may also be interconnected via other types of local area networks or other connection mechanisms. Additional components are also connected to the Ethernet 30. For example, application data servers 32 that hold data for use by application programs run on the VRU 20 and the MOCs 22, and one or more network information distribution servers (NIDS) 34 may be connected to the Ethernet 30. The NIDS servers 34 execute database server application programs that provide service components 20, 22 and 24 with data from a database (DB) 36. The database 36 holds data regarding customer accounts and service parameters. In the illustrative embodiment of the present invention, this data includes information that identifies a dialing plan preferred by a customer. The database 36 may hold such information for multiple customers. The data stored within the database 36 originates within service order entry 42 that is created at the time that a customer requests initiation of service. A mainframe computer system maintains a master copy of the database. A data distribution system (DDS) (see 40 in FIG. 10) is provided for distributing the data via a wide area token ring network 38 to the NIDS servers 34 that are part of the ISN 10. Specifically, updates to the database may be forwarded from the mainframe database 40 via the DDS token ring 38 to the NIDS server 34.

The illustrative embodiment of the present invention is manifest in the application programs executed by the VRU 20 and the MOCs 22 and in the database 36 that is accessed by the NIDS servers 34 to support multiple dialing plans. The present invention may be applied to multiple types of service, including calling card service, collect calling service and prepaid card service. These services may be provided by the VRU 20 or by a MOC 22. In the illustrative embodiment, an application program is provided for each type of service, and respective application programs are executed by the VRU 20 and the MOCs 22. As will be described in more detail below, these application programs include logic to identify the dialing plan that is to be used by a caller. The application programs also translate digits of a phone number entered by a caller into digits that comply with the dialing plan of the locale from which the phone call was initiated (i.e. the caller entered number is converted into the digits needed to a place the call on the local PSTN 12).

Figure 2:
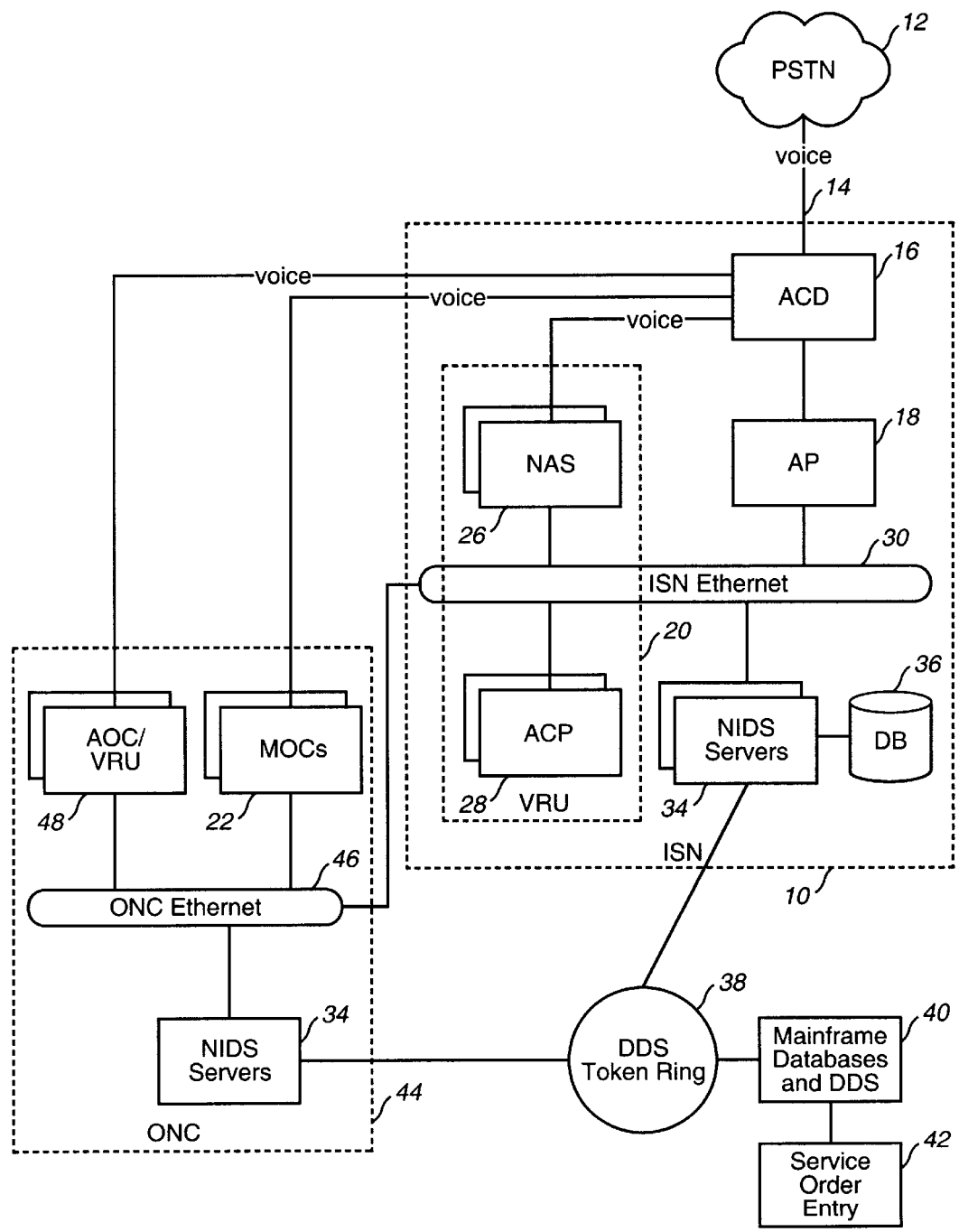
FIG. 2 is a block diagram illustrating an alternate telecommunication system that is suitable for practicing the illustrative embodiment of the present invention.

FIG. 2 illustrates an alternate telecommunication system configuration that is suitable for practicing the illustrative embodiment of the present invention. This configuration differs from the configuration depicted in FIG. 1 in that the MOCs 22 are located at a remote operator network center (ONC) 44 that is located remotely from the ISN 10 that houses the ACD 16. The ONC 44 is logically part of the ISN 10. The ONC includes automated operator counsels (AOCs) that are implemented by VRUs 48 for providing automated operator services. The MOCs and the AOCs are interconnected to an ONC Ethernet 46, which in turn is interconnected with the ISN Ethernet 30. One or more NID servers 34 may be coupled to the ONC Ethernet and also coupled with a DDS token ring 38.

Those skilled in the art will appreciate that the configurations shown in FIGS. 1 and 2 are intended to be merely illustrative and not limiting of the present invention. The present invention may also be practiced within a programmable switch or other mechanism that is able to receive digits of a caller originated number and translate those digits into digits that are proper for the dialing plan of the location from which the call originated. The switch must be able to complete the call to a local PSTN or other local telephone network. Those skilled in the art will also appreciate that the present invention may be practiced with a wide variety of telephone networks.

Figure 3:
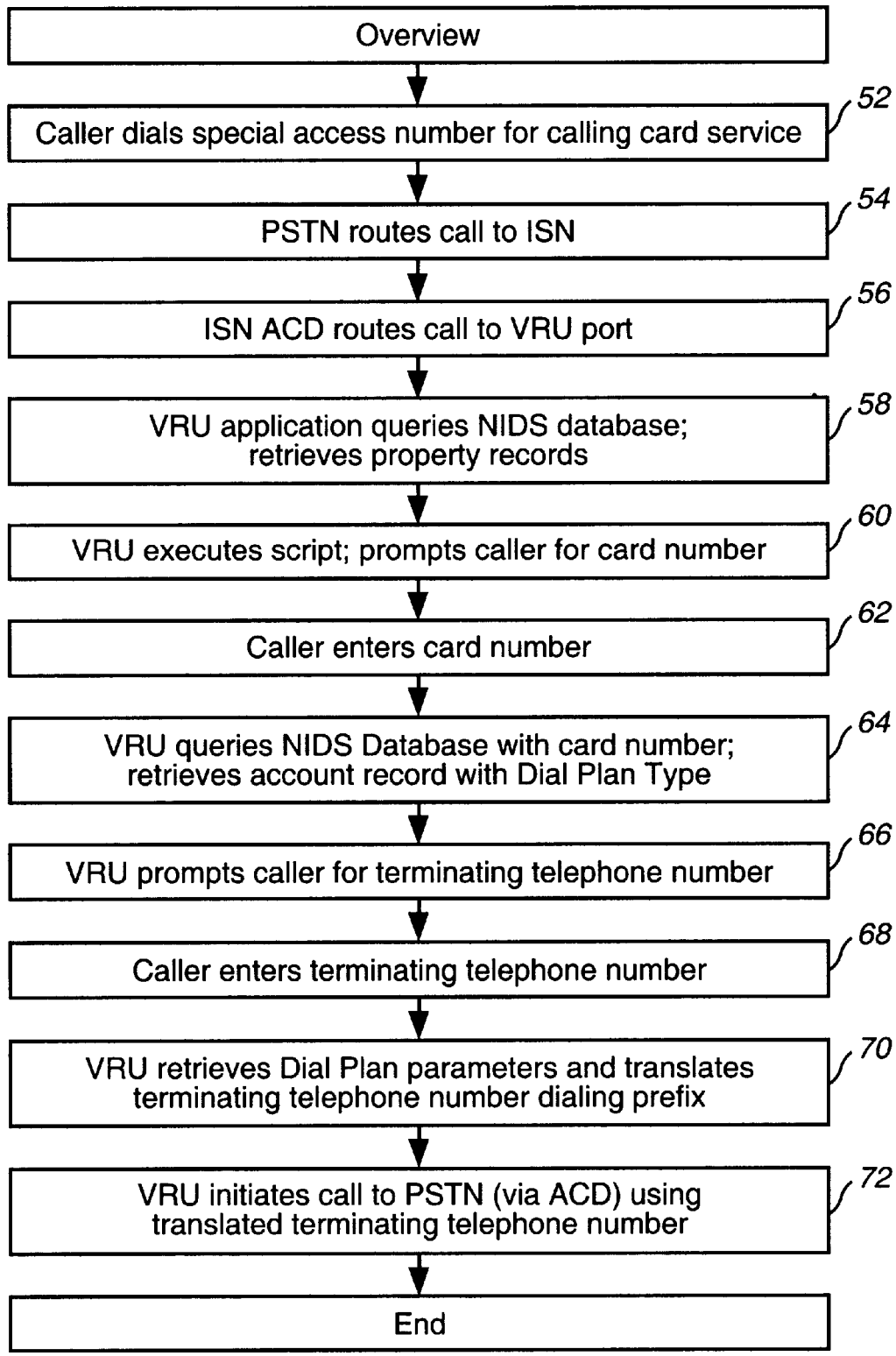
FIG. 3 is a flow chart illustrating the steps that are performed by the illustrative embodiment in translating a call to facilitate a caller's dialing plan.

FIG. 3 provides an overview of the steps performed in the illustrative embodiment of the present invention to support the user selected dialing plan. The flowchart assumes that the user (i.e., the caller) initiates a call via a calling card. Hence, a caller dials a special access number that is associated with the calling card service (step 52 in FIG. 3). Typically, this access number is a toll-free number such as an 800/888 number. The call is routed through the PSTN 12 to the ISN 10 (step 54 in FIG. 3). In particular, the PSTN 12 routes the call to the ACD 16 within the ISN 10. The ACD 16 receives the call and issues a query to the AP 18. The AP 18 determines that the call is to be routed to an application program that is run on the VRU 20 based upon the dialed special access number. The AP 18 responds to the query sent from the ACD 16 with a response that instructs the ACD to queue the call to a port group that terminates to the application program running on the VRU 20. The AP 18 sends a "call offered" message via the Ethernet 30 to the VRU 20 to notify the VRU that a call requiring a particular application is being routed to the VRU 20. The call is then routed to the designated port on the VRU 20 (step 56 in FIG. 3).

The VRU application program is launched and sends a query message to the NIDS servers 34 to access the database 36. The query holds the ANI of the cell and the access number that was dialed by the caller of the call. The query may also hold additional information. In response, the NIDS server 34 retrieves an access property record and an ANI property record that is associated with the access number and ANI of the call, respectively from the database 36. These property records are forwarded to the VRU 20 (see step 58 in FIG. 3). The VRU 20 receives these records and uses the records to determine how to process the call. For example, the records may hold information regarding the language preference for the caller and which scripts to play to the caller. These records may also hold a customer identifier and information regarding what services are to be provided to the caller (i.e. customer).

The VRU 20 then executes a script in accordance with the service that is being provided. In the case of calling card service, the script prompts the caller to enter a calling card number (see step 60, FIG. 3). The caller enters the card number by pressing buttons on a keypad of a telephone that the caller uses (step 62 in FIG. 3).

The VRU 20 queries the database 36 using the card number entered by the caller as an index. The NIDS server 34 retrieves an account record that is associated with the caller's card number. This account record is sent to the VRU 20 and includes a dial plan type value which identifies the dialing plan that is assigned to the caller (step 64 in FIG. 3).

The VRU 20 prompts the caller to enter a terminating telephone number (step 66 in FIG. 3). The terminating telephone number is the number that the caller wishes to dial and the terminating telephone number is entered in accordance with the dialing plan that has been assigned to the caller. The prompt may be an audio message that is played by the NAS 26 for the caller. The audio message is selected based on dialing plan type. The audio message instructs the caller to enter a terminating number in accordance with the dialing plan of the caller's home country or whatever dialing plan the caller has selected. For example, if the caller is assigned a United Kingdom dialing plan and is currently placing a call from the United States, the audio message might state: "To place a call to the U.K., dial 0 then the number. To place an international call, dial 00, country code, then the number."

The caller then enters the terminating telephone number (step 68 in FIG. 3). The caller enters the terminating number by depressing the appropriate keys on a telephone keypad. The VRU 20 retrieves the parameters for the dialing plan assigned to the caller and translates the terminating telephone number to correspond with the country from which the call is being placed (step 70 in FIG. 3). The steps involved in translation will be described in more detail below. The translation results in a translated terminating telephone number that is appropriate for use with the dialing plan of the country from which the call is being originated. The VRU 20 initiates a call to the PSTN 12 by way of ACD 16 using the translated terminating telephone number (step 72 in FIG. 3). Specifically, the VRU 20 outpulses the digits of the translated terminating telephone number on a second trunk that leads to the ACD 16. The ACD 16 sets up a call that leads to the PSTN 12. The PSTN switch to the which the ACD 16 is connected is a bridging switch so that when the terminating call leg is established, the ACD sends instructions to the PSTN bridging switch to bridge the originating call leg from the caller with the terminating call leg. After the legs are bridged, the ACD 16 and the VRU 20 drop the call.

The discussion below focuses on how the VRU 20 and the MOCs 22 perform the translation of the terminating number entered by the caller into a set of digits that conforms with the dialing plan for the location from which the call originates.

When the VRU 20 is performing the translation, it utilizes a configuration file that holds parameters regarding respective dialing plans. These parameters characterize and differentiate the dialing plans. FIG. 4 depicts an example of a configuration file 74 that may be used by the VRU 20 in translating a number entered by a caller. Each row of the configuration file 74 is associated with a different dialing plan. For the example depicted in FIG. 4, row 76 is associated with the dialing plan type 1 and row 78 is associated with the dialing plan type 5. Those skilled in the art will appreciate that the configuration file may include more than two rows. The number of rows is dictated by the number of dialing plan types. Furthermore, those skilled in the art will appreciate that the data that characterizes dialing plans need not be stored in the exact format depicted in FIG. 4. For example, the data may be stored in multiple files or could be stored in a database.

The parameters stored within the configuration file 74 are grouped according to termination type. Termination types include domestic termination, international termination and special terminations. A domestic termination refers to determining numbers that follow the format a caller uses to place a call from within the home country of the caller to a destination within the home country of the caller. International termination refers to terminating numbers that follow the format a caller enters if the caller is placing a call from their home country to a destination outside of their home country. Special termination refers to terminating numbers that are specialized numbers specific to the home country of the caller.

In the configuration file, these parameters are grouped by domestic termination 80, international termination 82 and special terminations 84 and 86. Specifically, parameters 90, 92, 94, 96, 98, 100 and 102 are grouped under domestic termination 80. Parameters 104, 106, 108, 110 and 112 are grouped under international termination 82. Parameters 1 14, 116, 118, 120 and 122 are grouped under a first special termination 84, whereas parameters 124, 126, 128, 130 and 132 are grouped under a second special termination 86.

Parameter 90 holds a country code value that corresponds to the country code of the domestic country in which the dial plan is based. As will be described in more detail below, this country code value is used to determine if calls that are dialed as international calls are to actually be treated as domestic calls. The maximum city length (MaxC Length) parameter 92 holds a value that specifies the maximum number of digits that may be included in the city code. The MaxC Length parameter 92 is provided to aid in passing the terminating number to help identify the locale associated with the terminating number. Parameters 94, 104, 114 and 124 hold values that specify dial prefixes for respective termination types. A dial prefix is a prefix numbers that a caller typically enters when placing a call for this termination type. A value of "9999" indicates that there is no value for a parameter. Parameters 96, 106, 116 and 126 hold switch prefix values that may be appended to the beginning of a number before performing checks on the number during the translation process (as will be described in more detail below).

Parameters 98, 108, 118 and 128 hold values that specify the minimum terminating number length in digits for respective termination types. For example, a value of 10 specifies that the terminating number that is being processed must have at least 10 digits. Parameters 100, 110, 120 and 130 hold values that specify the maximum terminating number length for respective termination types. For example, a value of 11 indicates that the terminating number being processed may have at most 11 digits. The nature of address (NOA) parameters 102, 112, 122 and 132 identify the nature of the address that is required by a switch for the particular termination type.

Figure 5A:
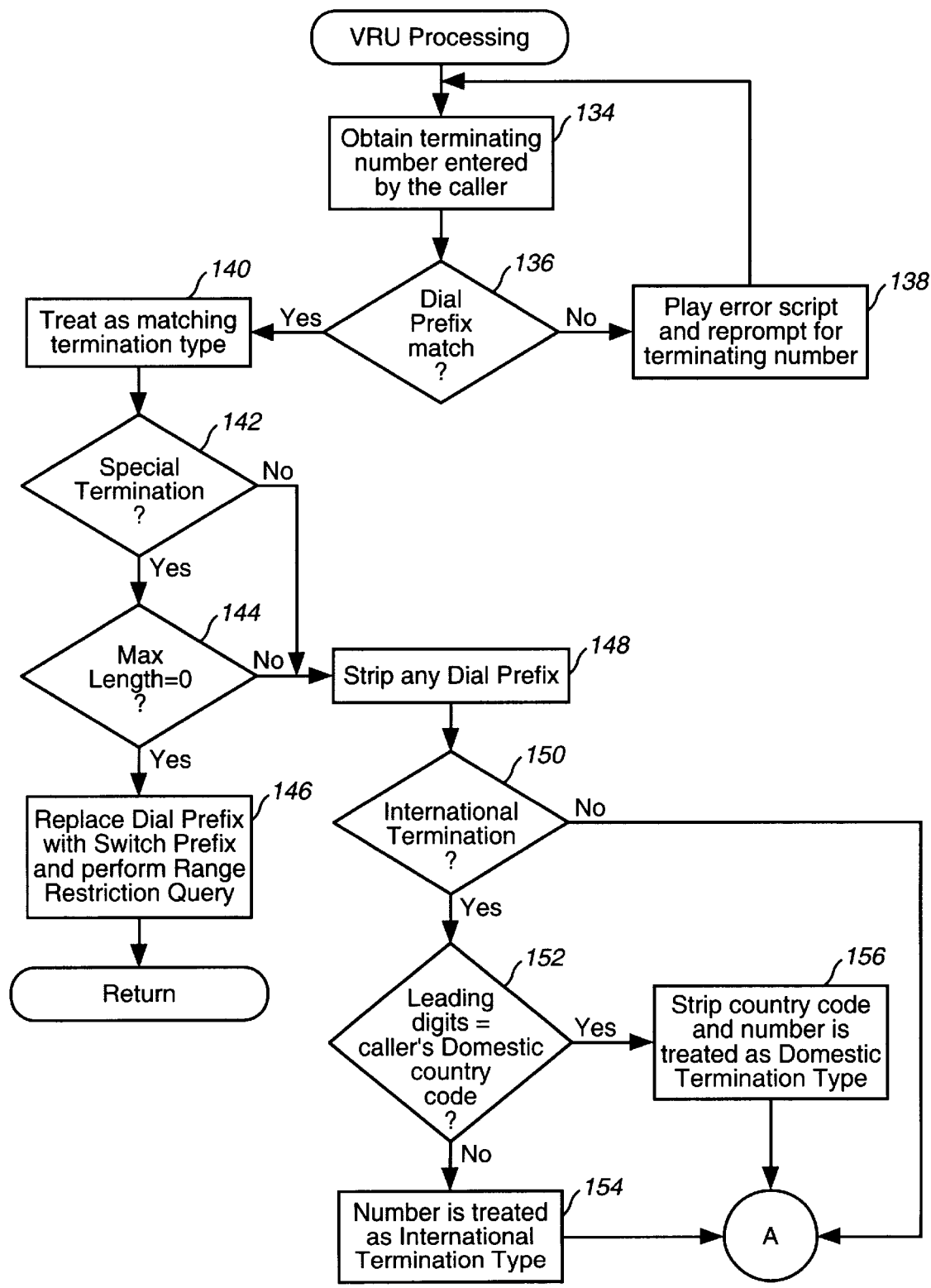
FIGS. 5A and 5B show a flow chart that illustrates the steps performed by an audio response unit (ARU) in the illustrative embodiment.
Figure 5B:
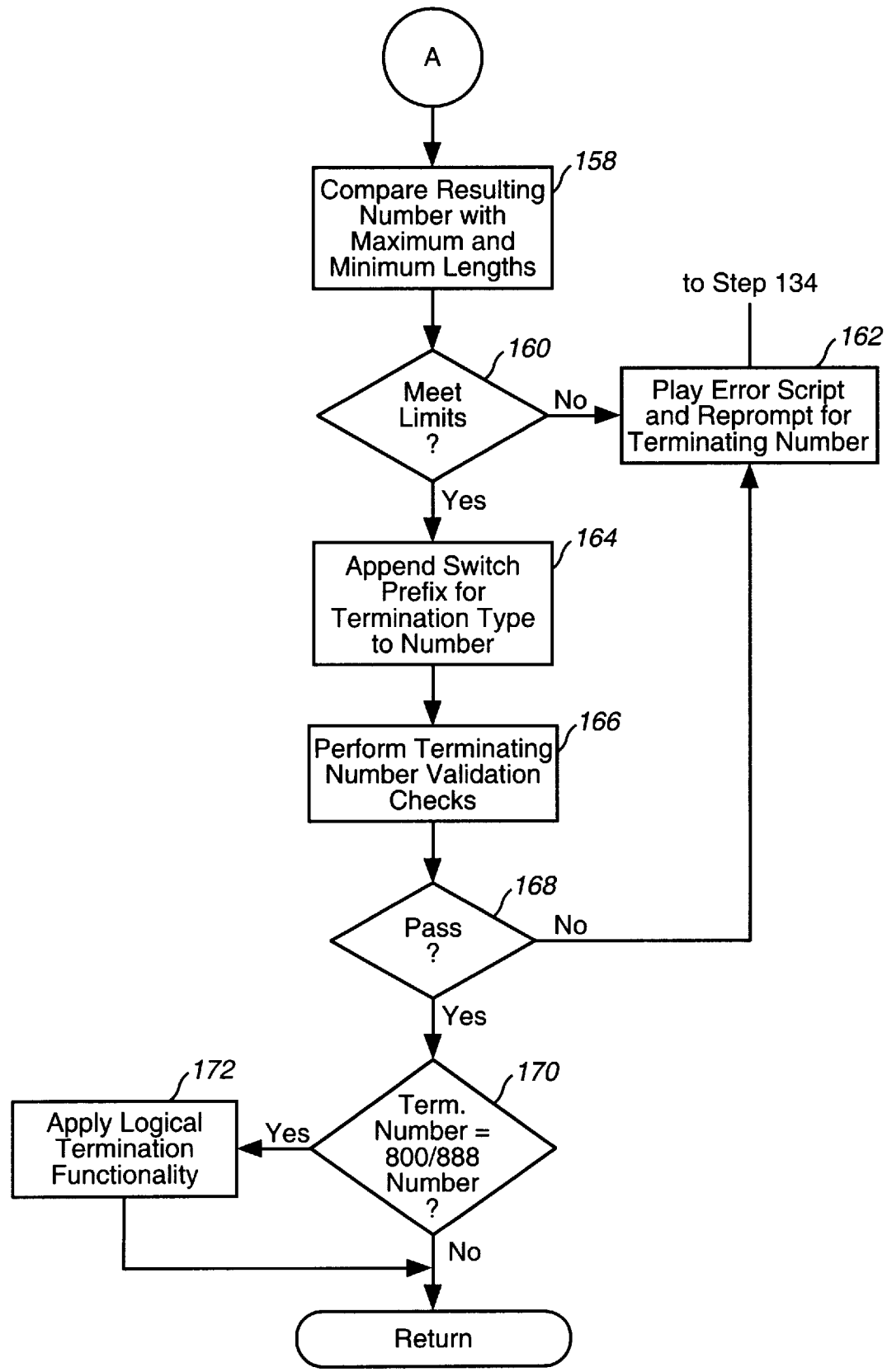

FIGS. 5A and 5B depict the steps that are performed by the VRU 20 in realizing the translation of a terminating number entered by a caller. Initially the terminating number that has been entered by the caller is obtained (step 134 in FIG. 5A). The leading digits of the terminating number are then compared with the value stored in the dial prefix parameters 94, 104, 114 and 124 to determine if there is a match (step 136 in FIG. 5A). If there is a match, the terminating number is treated as being of the termination type that has the matching dial prefix value (step 140 in FIG. 5A). For example, if the terminating number had a dial prefix of "011" and the caller employed dialing plan type 1, the terminating number is treated as being of international terminating type (see 104 in FIG. 4). If, however, there is no dial prefix match, an error script is played (such as an audio message that is output by the VRU 20), and the caller is re-prompted to enter the terminating number (step 138 in FIG. 5A).

In instances where there is a dial prefix match (see steps 136 and 140 in FIG. 5A), a determination is made whether the terminating number is determined to be of a special termination type (step 142 in FIG. 5A). If the number is determined to be of the special termination type and the maximum terminating number length parameter 100, 110, 120 or 130 has a value of zero (see step 144 in FIG. 5A), the digits constituting the dial prefix are replaced with the values held in the switch prefix parameter 96, 106, 116 or 126 and a range restriction query test applied to ensure that the resulting number lies within acceptable range of terminating numbers (step 146 in FIG. 5A). If the number passes the query, the number is outpulsed to complete the call.

For other types of calls that have been determined to be of a given termination type, the digits constituting the dial prefix are stripped or removed from the terminating number (step 148 in FIG. 5A). After the removal of these digits, it is possible that the resulting terminating number that appears to be an international call is actually a domestic call. Thus, in step 150 of FIG. 5A, a determination is made whether the call is of the international termination type and, if so, the leading digits are compared to the domestic country code of the caller (step 152 in FIG. 5A). In other words, a determination is made whether the caller placed the call as an international call but then specified the home country of the caller in the country code such that the call is actually a domestic call. In such cases, the country code is removed from the resulting number, and the resulting number is treated as being of the domestic termination type. If the number has been determined to be of the international termination type and the leading digits do not match the domestic country code for the caller, the number continues to be treated as being of the international termination type (step 154 in FIG. 5A).

A check is then made of the resulting number to determine whether the resulting number lies within the length limits established by the minimum terminating number length and maximum terminating number length parameters for the dialing plan of the caller (step 158 in FIG. 5B). If the terminating number does not fall within the limits (see step 160 in FIG. 5B), an error script is played, and the caller is re-prompted to enter a new terminating number (step 162 in FIG. 5B). The process is then repeated again beginning with step 134.

If the resulting number falls within the length limits (see step 160 in FIG. 5B), the switch prefix parameter value for the given termination type is appended to the number (step 164 in FIG. 5B). Before outpulsing the resulting number, a number of checks must be made. First, terminating number validation checks are performed (step 166 in FIG. 5B). These terminating number validation checks ensure that the resulting numbers are in the proper format for the native dialing plan from which the call originates. These checks include format checks, range checks and the like. If the resulting number does not pass the terminating number validation checks (see step 168 in FIG. 5B), the error script is played and the caller is re-prompted for the terminating number (step 162 in FIG. 5B). The above-described process is repeated beginning at step 134 of FIG. 5A. If the resulting number passes the terminating number validation checks in step 168 of FIG. 5B, a check is made to determine whether the terminating number is an 800 number or an 888 number (see step 170 in FIG. 5B). If the terminating number is an 800 number or an 888 number, logical termination functionality is applied (step 172 in FIG. 5B). Otherwise, the resulting number is outpulsed to complete the call.

A similar process is performed by the MOCs 22. In particular, as has been described above, an application program runs on the MOCs 22 to assist a human operator in transparently and easily translating a caller-provided number into a format that is appropriate for the dialing plan from the call originates. The MOCs 22, like the VRU 20, utilize a configuration file. FIG. 6 depicts an example of such a configuration file 176. Rows 184 and 186 are provided for respective dialing plans. Parameters are grouped according to termination type. In the example shown in FIG. 6, parameters are grouped according to domestic termination type 178, international termination type 180 and special termination type 182. The parameters are largely similar to those that are provided in the configuration file used by the VRU 20. The country code parameter 190 holds a country code value, and a maximum country code length parameter 192 holds a value of the specifies the maximum length in digits of the country code. Parameters 194, 206 and 218 hold dial prefix values. Parameters 196, 208 and 220 hold switch prefix values. Parameters 198, 210 and 222 hold minimum terminating number length values. Parameters 200, 212 and 224 hold maximum terminating number length values. Parameters 202, 214 and 226 hold NOA values. Parameters 204, 216 and 228 hold terminating type values where a value of "0" specifies domestic termination type, a value of "1" holds an international terminating type value and a value of "2" specifies a special terminating type value.

Figure 7:
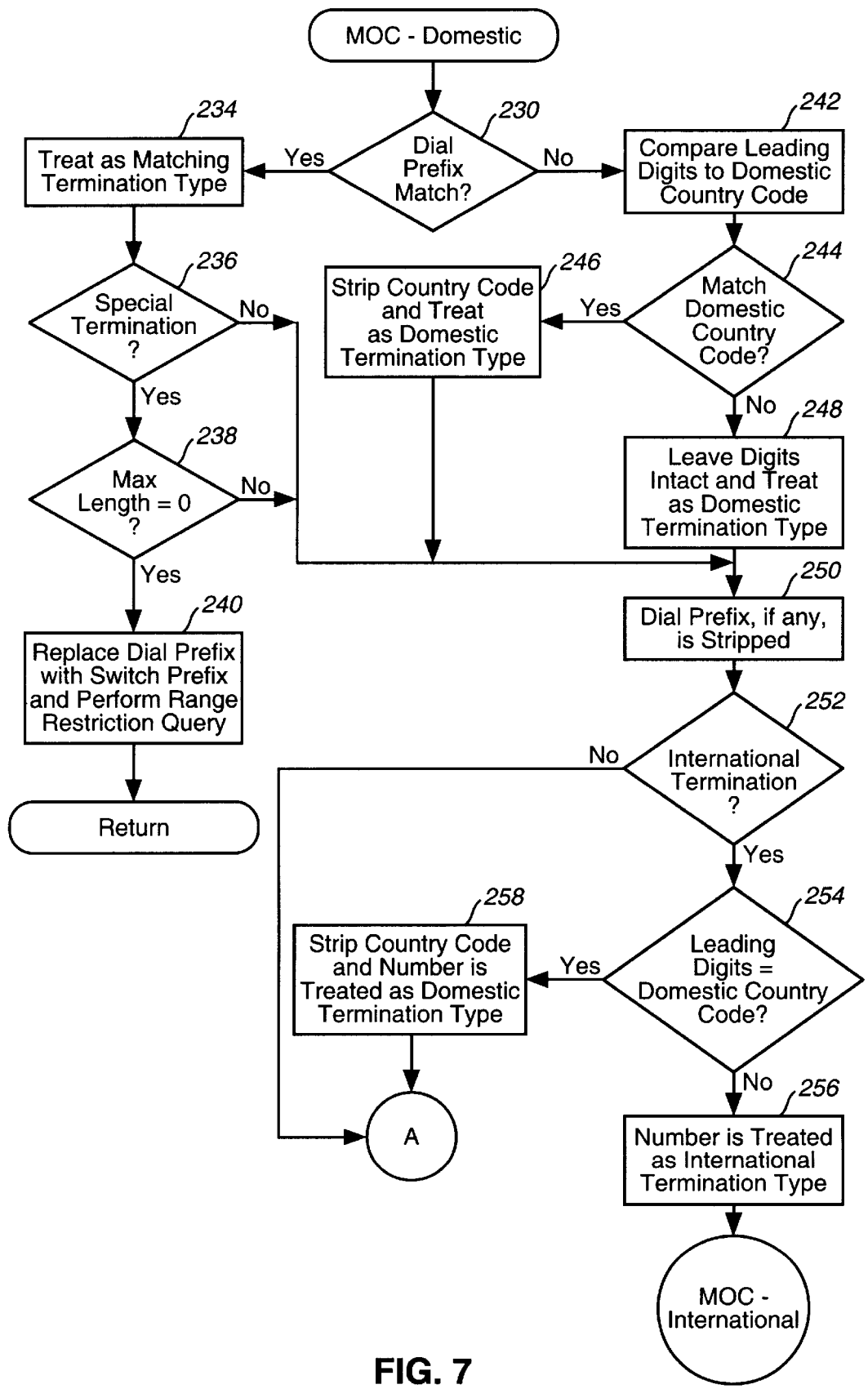
FIG. 7 is a flow chart illustrating the steps that are performed in processing a domestic phone call by the MOC.

The application programs run on the MOCs 22 provide translation of numbers entered by callers into formats that are compatible with the dialing plans of the origination sites of the calls. The MOCs 22 run in either a domestic mode for handling domestic calls or an international mode for handling international calls. FIG. 7 depicts the steps that are performed in translating a call in domestic mode. Initially, the leading digits of the terminating number provided by the caller are compared to the dial prefix parameter values for the termination types in the calling plan chosen by the caller (see step 230 in FIG. 7). If there is a match, the terminating number is treated as being of the matching termination type (step 234 in FIG. 7). A check is then made if the termination type is a special termination type (step 236 in FIG. 7) and if the maximum terminating number length parameter has a value of zero (see step 238 in FIG. 7). If both of these conditions are true, the dial prefix digits in the terminating number are replaced with the switch prefix value for the designated special termination type and a range restriction query is performed on the resulting number to determine whether the resulting number lies within an acceptable range of telephone numbers (step 240 in FIG. 7). If the resulting number lies within the acceptable range, the digits of the resulting number are outpulsed to complete the call.

In instances where the leading digits of the terminating number do not match the dial prefixes, the leading digits are compared to a domestic country code of the domestic country for the dialing plan of the caller (step 242 in FIG. 7). If these leading digits match the domestic country code (see step 244 in FIG. 7), the digits are stripped from the number, and the number is treated as a domestic termination type call (step 246 in FIG. 7). In such an instance, the caller has originated an international call to the country associated with the dialing plan of the caller. In other words, the caller has originated a domestic call in an international call format. In cases where there is not a match the digits are left intact and the number is treated as being of the domestic termination type (step 248 in FIG. 7).

In the next step of processing, the dial prefix, if any, is stripped from the number that is being processed (step 250 in FIG. 7). There is a possibility that the number that results after the dial prefix is removed is still in international format. Thus, the application running on the MOC 22 determines if the number has been deemed to be of international termination type (see step 252 in FIG. 7) and then determines if the leading digits of the resulting number correspond to the domestic country code of the caller (step 254 in FIG. 7). If there is a match, the country code is removed from the number and the remaining number is treated as being of the domestic termination type (step 258 in FIG. 7). On the other hand, if the leading digits do not match the domestic country code, the number is treated as being of the international termination type and is treated accordingly, as will be described in more detail below (step 256 in FIG. 7).

Figure 8:
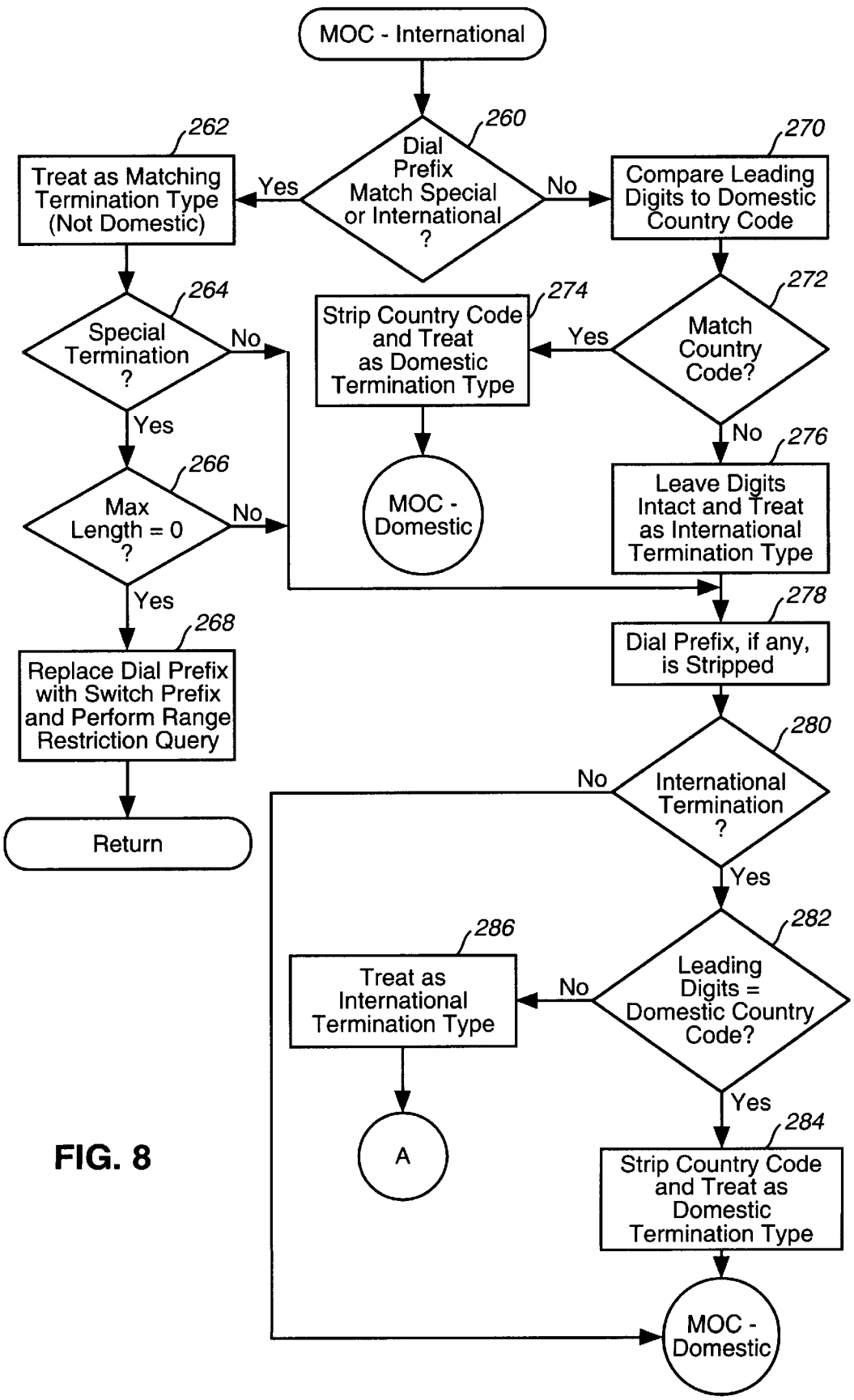
FIG. 8 is a flow chart illustrating the steps that are performed in processing an international call by the MOC.

FIG. 8 depicts the steps that are performed by an MOC 22 when in international mode. Initially, the leading digits of the terminating number provided by the caller are compared to dial prefixes for an international termination type and special termination types (step 260 in FIG. 8). The dial prefix for the domestic termination type is not compared in step 260 of FIG. 8. If there is a match, the number is treated as being of the matching termination type (step 262 in FIG. 8). A test is then made to see if the termination number is of a special termination type (step 264 in FIG. 8) and has a maximum terminating number length parameter value of "0" (see step 266 in FIG. 8). In such an instance, the dial prefix digits within the terminating number are replaced with the switch prefix parameter value for the dialing plan and matching termination type, and a range restriction query is performed on the number (step 268 in FIG. 8). If the resulting number lies within an acceptable range, the resulting number is outpulsed to complete the call.

If there is not a dial prefix match (as checked in step 260 of FIG. 8), the leading digits of the terminating number are compared to domestic country code for the caller's dialing plan (step 270 in FIG. 8). If there is a match (step 272 in FIG. 8), the country code digits are stripped from the terminating number and the terminating number is treated as being of a domestic termination type. Otherwise, the digits are left intact and the number is treated as being of the international termination type (step 276 in FIG. 8).

In step 278 of FIG. 8, any dial prefix on the terminating number is stripped. A check is then made whether the number has been deemed to be of the international termination type (step 280 in FIG. 8) and if the leading digits of the terminating number after the dial prefix has been stripped match the domestic country code of the caller's dialing plan (see step 282 in FIG. 8). In such an instance, the country code is stripped from the terminating number and the terminating number is treated as being of the domestic termination type (step 284 in FIG. 8). If the leading digits match the domestic country code in step 282 of FIG. 8, the call is treated as being of the international termination type and processing proceeds in a fashion like that discussed above relative to the VRU beginning at step 158 as shown in FIG. 5B.

While the present invention has been described with reference to an illustrative embodiment thereof, those skilled in the art will appreciate that various changes in form and detail may be made without departing from the intended scope of the present invention as defined in the appended claims. For example, the translation need not be performed by a call processing platform, but may instead be performed by other intelligent facilities, such as computer systems and digital switches. Moreover, the present invention may support translation in environments where the phone call does not originate from a conventional telephone set, but rather originates from a computer resource, such as a personal computer.

We claim:

1. In a telecommunications system having an intelligent node, a method comprising the steps of:

receiving at the intelligent node an indication of a first set of digits dialed by a caller to initiate a call from a locale where a first dialing plan is used, wherein the first set of digits conform with at least one selectable second dialing plan;

converting the first set of digits dialed by the caller into a second set of digits having a format that conform with the first dialing plan, wherein the intelligent node includes a voice response unit and the voice response unit performs the converting; and completing the call using the second set of digits as a phone number for the call.

2. The method of claim 1 wherein the first dialing plan is used by a first country and the second dialing plan is used by a second country that differs from the first country.

3. The method of claim 1 wherein the intelligent node is a call processing platform.

4. The method of claim 1 further comprising the steps of:
   providing information that identifies that the second dialing plan is being used by the caller; and
   determining that the first set of digits dialed by the caller likely conform with the second dialing plan and need to be converted based on the provided information.

5. The method of claim 1 wherein a number of digits in the first set of digits dialed by the caller is less than a number of digits in the second set of digits.

6. The method of claim 1 wherein the caller dialed the call as if the call were a domestic call wherein the call was actually an international call when originated from the locale.

7. The method of claim 1 further comprising the steps of:
   receiving at the intelligent node an indicator of a third set of digits dialed by the caller to initiate a second call from a second locale where a third dialing plan is used, wherein the third set of digits conform with the second dialing plan;
   converting the third set of digits dialed by the caller into a fourth set of digits having a format that complies with the third dialing plan; and
   completing the call using the fourth set of digits as a phone number for the second call.

8. The method of claim 1 wherein the intelligent node includes a manual operator console for assisting an operator and the manual operator console performs the converting.

9. In a telecommunications system having a call routing device and an intelligent node, a computer-readable medium holding computer-executable instructors for performing a method, comprising the steps of:

receiving at the intelligent node an indication of a first set of digits dialed by a caller to initiate a call from a locale where a first dialing plan is used, wherein the first set of digits conform with at least one selectable second dialing plan;

converting the first set of digits dialed by the caller into a second set of digits having a format that complies with the first dialing plan, wherein the intelligent node includes a voice response unit and the voice response unit performs the converting; and forwarding the second set of digits to the call routing device to be used as a phone number for completing the call.

10. The computer-readable medium of claim 9 wherein the first dialing plan is used by a first country and the second dialing plan is used by a second country that differs from the first country.

11. The computer-readable medium of claim 9 wherein the intelligent node is a call processing platform.

12. The computer-readable medium of claim 9 wherein a number of digits in the first set of digits dialed by the caller is less than a number of digits in the second set of digits.

13. The computer-readable medium of claim 9 wherein the caller dialed the call as if the call were a domestic call wherein the call was actually an international call when originated from the locale.

14. In a telephone network, a method comprising the steps of:

providing a user with a choice of one or more selectable and modifiable dialing plans, via a voice response unit contained within the telephone network;

in response to a user choice, assigning a selected one of the one of more selected and modifiable dialing plans to the user;

where the user originates a call from an origination site that employs a different dialing plan than the selected dialing plan, permitting the user to place the call as if the selected dialing were employed and completing the call.

15. The method of claim 14 wherein the user originates the call using a calling card.

16. The method of claim 14 wherein each of the calling plans is associated with a given country and wherein the selected dialing plan is associated with a different country than a country associated with the dialing plan of the origination site.

17. The method of claim 14 wherein the user originates the call without using a calling card.

18. In a telephone network having a call processing platform that includes a storage, a method comprising the steps of:

receiving a call from a caller at the call processing platform;

providing information that is stored in the storage, said information identifying at least one selectable and modifiable dialing plan to be used for the caller;

determining that the caller uses the selected dialing plan by accessing the information in the storage;

receiving an indication of digits dialed by the caller from a location to originate a user call, wherein said location employs a given dialing plan;

determining whether the selected dialing plan and the given dialing plan differ;

where the selected dialing plan and the given dialing plan differ, translating the digits that were dialed by the caller into a sequence of digits that complies with the given dialing plan, wherein the call processing platform includes a voice response unit and the voice response unit performs the translating; and outputting the sequence of digits that complies with the given dialing plan to initiate the user call.

19. The method of claim 18 further comprising the step of outputting the digits dialed by the caller to initiate the user call where the selected dialing plan and the given dialing plan do not differ.

20. The method of claim 18 further comprising the step of requiring the caller to enter a calling card number.

21. The method of claim 18 wherein the call received by the call processing platform was initiated by the caller dialing a toll free number.

22. The method of claim 18 wherein the call processing platform maintains a database in the storage that holds information regarding the caller and wherein the information that identifies that the selected dialing plan is to be used by the caller is in the database.

23. The method of claim 18 wherein the call processing platform includes a manual operator console for assisting a human operator in call handling and the manual operator console performs the translating.

24. A call processing platform comprising:

an interface with a telephone network for receiving a call from a caller at an origination site having an associated dialing plan;

a storage for storing information regarding a preferred selectable and modifiable dialing plan that is preferred by the caller among multiple dialing plans;

a formatting component for accessing the storage to identify the preferred dialing plan of the caller and for formatting digits dialed by the caller from the origination site to initiate a user call into a formatted sequence of digits that conform with the associated dialing plan of the origination site, wherein the digits dialed by the caller conform with the preferred dialing plan; and an output component for outputting the formatted sequence of digits to the telephone network to complete the user call, wherein the formatting component is part of a voice response unit that provides voice response services to the call processing platform.

25. The call processing platform of claim 24 wherein the output component outputs the formatted sequence of digits to a digital switch within the telephone network.

26. The call processing platform of claim 24 wherein the interface to the telephone network includes a call switching mechanism for directing calls within the call processing platform.

27. The call processing platform of claim 26 wherein the call switching mechanism is an automatic call distributor (ACD).

28. The call processing platform of claim 24 wherein the formatting component and the storage support adding a new dialing plan that is preferred by at least one party.

29. The call processing platform of claim 24 wherein the formatting component supports the removal of a dialing plan from among those that may be assigned to the caller.

* * * * *